(12) United States Patent
Yokota et al.

(10) Patent No.: US 8,701,979 B2
(45) Date of Patent: Apr. 22, 2014

(54) CABLING WORK AIDING SYSTEM AND WORK AIDING METHOD

(75) Inventors: Toshimi Yokota, Hitachiota (JP); Kenji Araki, Mito (JP); Ryosuke Shigemi, Hitachi (JP); Ryota Arai, Hitachinaka (JP); Shinya Yuda, Hitachi (JP); Munetoshi Unuma, Hitachinaka (JP); Reika Kin, Abiko (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/646,996

(22) Filed: Dec. 24, 2009

(65) Prior Publication Data

US 2010/0163615 A1 Jul. 1, 2010

(30) Foreign Application Priority Data

Dec. 26, 2008 (JP) ................................. 2008-331834

(51) Int. Cl.
*G06F 17/00* (2006.01)

(52) U.S. Cl.
USPC ........................................................ 235/375

(58) Field of Classification Search
USPC ........................................................ 235/375
See application file for complete search history.

(56) References Cited

U.S. PATENT DOCUMENTS

| 5,606,651 | A | * | 2/1997 | Brown et al. ................. 345/631 |
| 5,704,189 | A | * | 1/1998 | Collier ......................... 52/741.1 |
| 6,728,730 | B1 | | 4/2004 | Muro et al. |
| 6,784,802 | B1 | | 8/2004 | Stanescu |
| 2007/0102505 | A1 | | 5/2007 | Yokota et al. |
| 2009/0085722 | A1 | * | 4/2009 | Fujita et al. ................. 340/10.1 |

FOREIGN PATENT DOCUMENTS

| JP | 2001-052149 | 2/2001 |
| JP | 2005-351681 | 12/2005 |
| JP | 2007-020360 | 1/2007 |
| JP | 2007-272508 | 10/2007 |
| JP | 2007-279914 | 10/2007 |

\* cited by examiner

*Primary Examiner* — Thien M Le
*Assistant Examiner* — Toan Ly
(74) *Attorney, Agent, or Firm* — Antonelli, Terry, Stout & Kraus, LLP.

(57) ABSTRACT

In the cabling work aiding system, the RFID reader reads the RFID attached to at least one of the terminal, its terminal block, and cable member. A cabling work terminal device is connected to the RFID reader. The device is comprised of: a data base that records a template connection diagram containing the terminal-side RFID region constituted by RFID data as to the terminal and a cable-side RFID region constituted by RFID data as to the cable member; a relating part that relates the RFID read by the RFID reader to the terminal-side RIFD region and the cable-side RIFD region defined in the template connection diagram; a terminal-cable member correspondence table preparing part that prepares a correspondence table for leading correspondence between the RFID data as to the terminal and RFID data as to cable member from correspondence between the terminal-side RIFD region and the cable-side RFID related by the RFID read by the RFID reader.

16 Claims, 18 Drawing Sheets

FIG. 10

| TERMINAL BLOCK ID | DRAWING TABLE ID | RFID REGION AT CABLE SIDE | RFID REGION AT TERMINAL SIDE |
|---|---|---|---|
| Xxx0 | Xxx0. bmp | ● | |
| Xxx1 | Xxx1. bmp | | |
| ... | | | |

| CABLE INFORMATION | RECTANGULAR REGION | | | | RFID |
|---|---|---|---|---|---|
| −1 | Xmax(0) | Ymax(0) | Xmin(0) | Ymin(0) | −1 |
| −1 | Xmax(1) | Ymax(1) | Xmin(1) | Ymin(1) | −1 |
| −1 | | | | | −1 |
| −1 | Xmax(i) | Ymax(i) | Xmin(i) | Ymin(i) | −1 |
| −1 | | | | | −1 |

FIG. 12

| TERMINAL BLOCK ID | DRAWING TABLE ID | RFID REGION AT CABLE SIDE | RFID REGION AT TERMINAL SIDE |
|---|---|---|---|
| Xxx0 | Xxx0. bmp | ● | |
| Xxx1 | Xxx1. bmp | | |
| ... | | | |

| CABLE INFORMATION | RECTANGULAR REGION | | | | RFID |
|---|---|---|---|---|---|
| −1 | Xmax(0) | Ymax(0) | Xmin(0) | Ymin(0) | −1 |
| ● | Xmax(1) | Ymax(1) | Xmin(1) | Ymin(1) | FFFF0001 |
| −1 | Xmax(1) | Ymax(1) | Xmin(1) | Ymin(1) | FFFF0002 |
| −1 | | | | | ... |
| −1 | Xmax(i) | Ymax(i) | Xmin(i) | Ymin(i) | −1 |
| −1 | | | | | −1 |

| NAME OF CABLE | CX70001 |
|---|---|
| CABLE CORE NUMBER | 0 |
| CONNECTION TERMINAL 1 | Xxx0, 1 |
| CONNECTION TERMINAL 2 | Yyy0, 2 |
| | |

CABLING WORK AIDING SYSTEM AND WORK AIDING METHOD

CLAIM OF PRIORITY

The present application claims priority from Japanese patent application serial no. 2008-331834, filed on Dec. 26, 2008, the content of which is hereby incorporated by reference into this application.

FIELD OF THE INVENTION

The present invention relates to a cabling work aiding system such as in a plant and a building and a work aiding method.

BACKGROUND OF THE INVENTION

In a cable connecting work performed when constructing such as a large scaled plant and building, since it is necessary to connect several ten thousands of cables and thereby errors of the cables likely occur, great care should be taken to avoid the errors of the cables. If connection errors of the cables occur, such may lead to an erroneous operation of a machine and apparatus therein, and may cause such a problem of destroying the machine and apparatus. Further, even for the work for checking cable connections, extreme time may be required. JP 2007-279914 as Patent document 1 discloses a system in which a cable connection work is performed by attaching RFIDs (RFID: radio frequency identification) to cable cores via tag. By attaching RFIDs to cable cores and by checking the IDs by making use of a reader, whether or not the cables are connected as designed is checked to thereby aid to enhance reliability of the connection work.

Since CAD (CAD: computer aided design) is used for the design of such construction, the CAD data can be utilized for connection data between terminals and cable cores in a cabling work system using RFIDs. When relating an RFID at the terminal side to an RFID at the cable core side in CAD data, through a work of reading a pair of an RFID at the terminal side and an RFID at the cable core side, a correctness and incorrectness judgment result of the connection can be displayed to a worker. Thereby, an erroneous connection can be prevented. Patent document 1 discloses a cabling work aiding system that avoids an erroneous connection by making use of such as RFIDs.

SUMMARY OF THE INVENTION

Thus, even in a cabling work such as in an existing plant and building, it is desired to apply the technology disclosed in patent document 1, however, there are many cases in which no CAD data exist such as in the existing plant and building, namely, there are many cases in which no terminal-cable core connection data exist or further there are cases in which even paper design data no longer has existed. When there is no connection data, it is required to begin a work to redraw an actual specification diagram from the connection condition, however, the work of preparing the actual specification diagram in CAD by a worker at the site while checking the connection diagram is a great burden for the worker at the site. Further, at a periodic regular inspection in a plant, since a process is required in which each of object to be inspected is electrically disconnected from the others, such a work is necessitated in which each of the connected cables is once wire-disconnected and the same is connected again after the inspection, however, in order to connect again as correctly according to the current connection condition, it is necessary to record the current connection condition. When a cable connection work system is used, it is necessary for a worker to input data recording the current connection condition in the system, which requires many time and labors.

In view of the above tasks, the present invention is, when there are no electronic data drawings such as in CAD for terminal-cable connection data, to permit a cabling work for a worker at the site to prepare an actual specification diagram A primary feature of the present invention is to obtain information on a terminal-cable connection diagram while relating RFID and cable information via electronic data or regions on paper drawings.

By means of the regions on the drawing, a worker can simply and easily perform an operation of relating RFID and information on cables while looking at a terminal block.

BRIEF DESCRIPTION OF THE DRAWINGS

FIG. 10 is an example of data belonging to the template connection diagram.
FIG. 12 is an example of data in the connection diagram.

DETAILED DESCRIPTION OF THE PREFERRED EMBODIMENTS

Embodiments will be explained herein below. However, embodiments are not limited to those of the followings.

Embodiment 1

Figure 1:
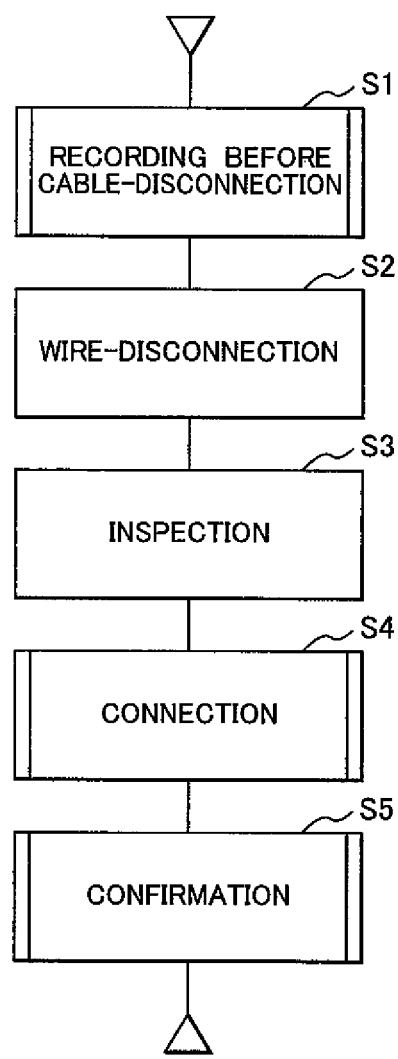
FIG. 1 is an example of a workflow.

FIG. 1 shows a flow of a cabling work. Herein, an explanation of one example will be done about the cabling work of electrical cable disconnections and reinstatement of the cable connections during an inspection as to apart of a plant as an example, but embodiments are not limited thereto. In the cabling workflow in FIG. 1, conditions of cable connections before the cable disconnections are recorded at a step S1, and the cable disconnections are carried out at a step S2. And then, the inspection for the plant is carried out at a step S3, after that, the each of cables is connected again according to the condition before the wire-disconnection or according to the condition of a connection diagram at a step S4. After that, the checking as to whether no errors in each cable connection is carried out at a step S5.

Figure 2:
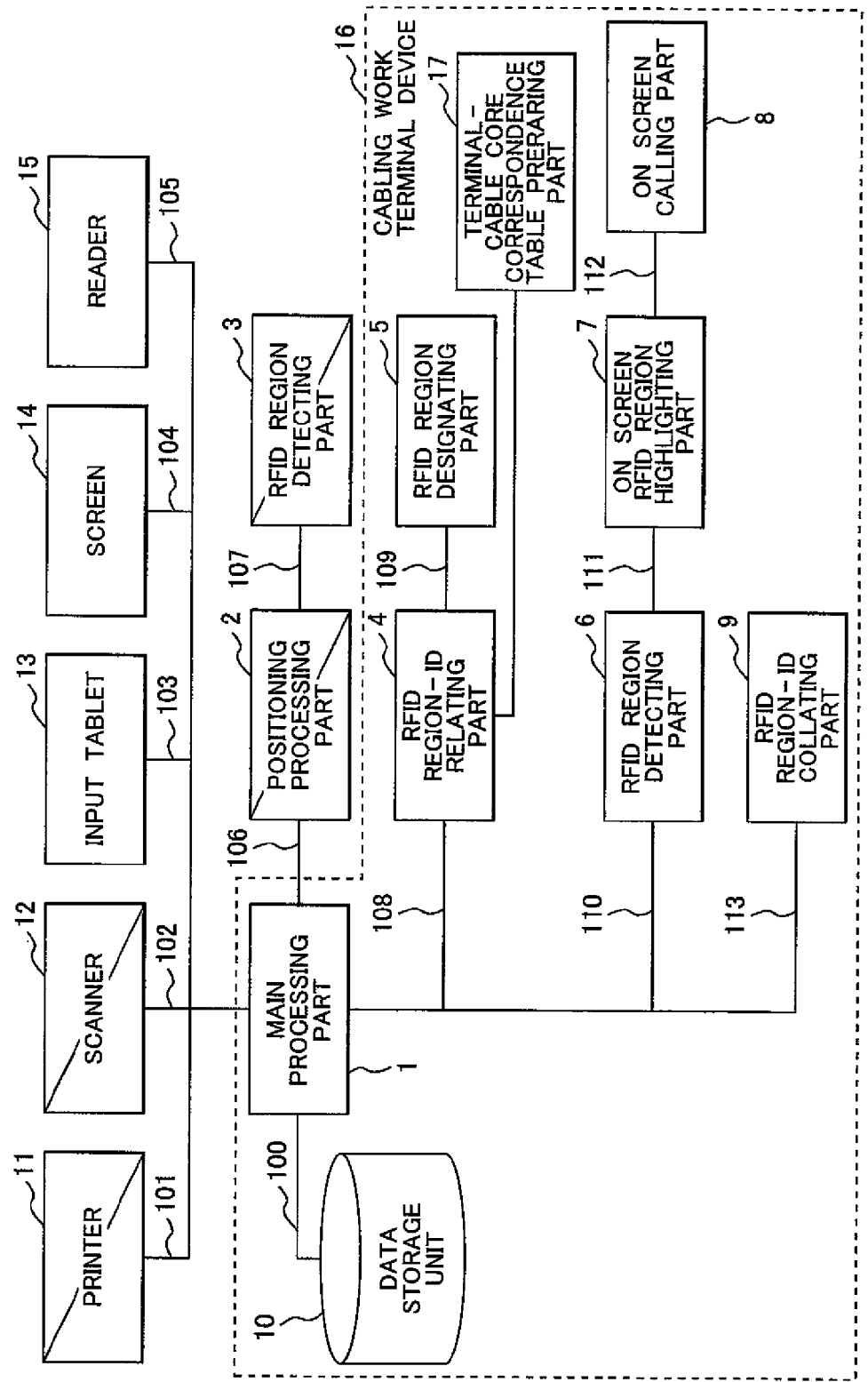
FIG. 2 is a constitutional diagram of a system.

FIG. 2 shows constitutional diagrams of a work aiding systems in embodiments 1 and 2 according to the present invention. For the embodiment 1, the system is configured with constitutions shown in rectangular functional blocks apart from some blocks each having a diagonal line. The embodiment 2 in which functions are expanded is constituted by including the blocks each having the diagonal line in addition to the rectangular functional blocks of the embodiment 1. The embodiment 2 will be explained later.

Figure 3:
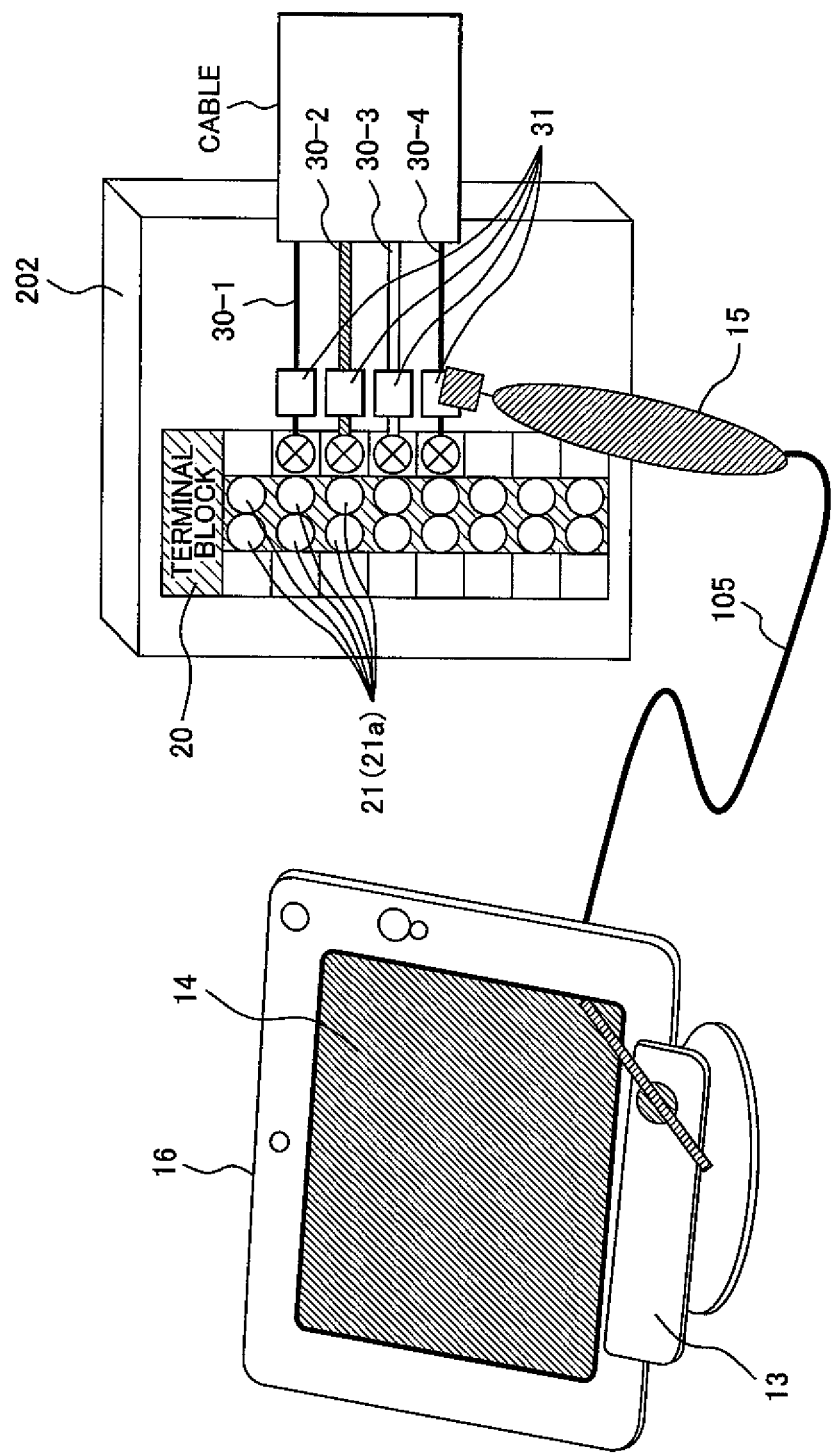
FIG. 3 is an outlook of the system.
Figure 19:
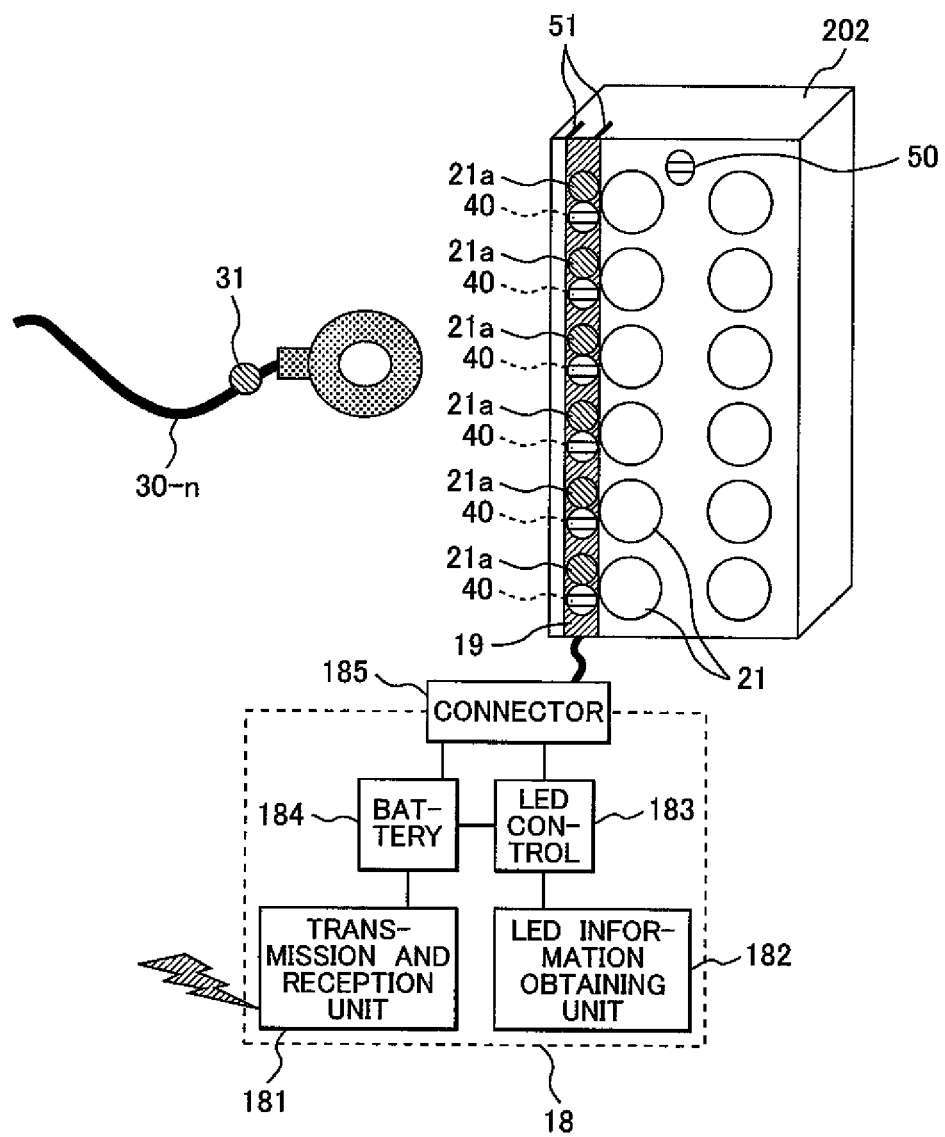
FIG. 19 is a view for explaining an RFID/LED plate.

FIG. 3 shows an example of an outlook as to a cabling work terminal device 16 of FIG. 2 and an example of a terminal block 20. Embodiments are not limited to this. First of all, the cabling work terminal device 16 as shown in FIG. 3 will be explained. Incidentally, in the present embodiment, an input tablet 13 and a display 14 as shown in FIG. 2 although are provided to the cabling work terminal device 16, the input tablet and the display may not be provided to the device 16 but they may provided aside from the device 16. Further, the cabling work terminal device 16 can be constituted so as to exchange data with a central processing unit (not shown in Figs.). In addition, in the present embodiment, a reader 15 is connected to the cabling work terminal device 16 via a communication medium 105 such as a cable. The terminal block 20 is, for example, provided on a backward of a control panel 202 in a plant in FIG. 3. The terminal block 20 is constituted by a plurality of terminals 21 being arranged in two in-line rows, and each of terminals 21 has a terminal-side RFID 21a. FIG. 3. shows an example wherein each of cable cores 30-1 to 30-4 as cable members constituting one cable 30 is connected to each of specified terminals 21 corresponding to the cores 30-1 to 30-4. Each RFID 21a is attached directly on each terminal 21 or alternatively, it may be attached onto a plate (not shown in Figs.) capable of being attached removably to the terminal block 20 only during the cabling work. Provided that the RFIDs 21a are arranged on the plate, the respective RFIDs 21a are arranged thereon so that each of the RFIDs 21a should be positioned close to each of the terminals corresponding to the respective RFIDs. A member in which RFIDs are attached on such a plate only during the cabling work will be called herein below as a RFID plate. In the embodiment, LEDs (light emitting diodes not shown in Figs.) may be provided on a plate to indicate the existence of the RFIDs 21a attached to the terminals 21 on the terminal block 20. If such a plate is provided with the LEDs apart from the RFIDs, the plate will be called as an LED plate or alternatively, if a plate is provided both of the RFIDs and the LEDs, the plate will be called as an RFID/LED plate (the RFID/LED plate 19 is shown in FIG. 19). Using the LEDs in addition to the RFIDs for cable terminals, an easy understandability as to the cable connecting work can be enhanced.

FIG. 19 shows another example of the control panel 202 in which the RFID/LED plate 19 is attached removably. The RFID/LED plate 19 is suitable for any of the systems in the following embodiments. The RFID/LED plate 19 is configured so that a plurality of pairs of the RFID 21a and LED 40 is arranged in one in-line row, but the arrangement of the RFID/LED plate 19 is not limited thereto. For example, a plurality of pairs of the RFID 21a and LED 40 may be arranged so that two in-line rows comprising one in-line row of the RFIDs 21a and another in-line row of the LEDs 40. By attaching the RFID/LED plate 19 to the terminal block 20 only during the cable connection work, the same advantage as that of the arrangement in which RFIDs 21a are attached to respective terminals 21 directly one by one as shown in FIG. 3. In addition, in the case of the RFID/LED plate 19, when each of RFIDs 30 at the cable core side is read at the time of the cable connection work to the specified terminal 21, a LED 40 paring up with an RFID 21a at the terminal side corresponding to the read RFID 30 (30-n) at the cable core side is controlled so as to turn on by LED controller 18. Thereby, the LED 19 can indicate a destination terminal 21 to be connected. In order to facilitate attaching the RFID/LED plate 19 to the terminal block 20, a pair of attachments 51 for the RFID/LED plate 19 is provided at the top and bottom the terminal block 20 in the arrangement direction of the terminals 21 so as to catch the terminal block 20. Such attachments 51 do not make interference to the cable connection work because they are provided at the position which never interferes with the cables. The position of each pair of the RFID 21a and the LED 40 assigned for each terminal 21 is determined so that a distance between the RFID 21a and the LED 40 used in each pair is nearer than a distance between adjacent pairs. Thereby a worker can intuitively and easily recognize each terminal indicated by each corresponding RFID 21a and LED 40. A signal for tuning on each LED 40 is received from the cabling work terminal device 16 (refer to FIGS. 2 and 3) to a LED controller 18. The LED controller 18 comprises a TR (transmitter-receiver) part 181 for communicating with the cabling work terminal device 16, a LED information obtaining part 182 for obtaining information as to LED control from TR part, a LED control part 183 for controlling respective LEDs 40 in accordance with the information from a LED information obtaining part 182, a battery 184, and a connector 185 for connecting to the control panel 202. For example, in order to control the LEDs 40 whose number are correspond to that of the terminals 21, the LED control part 182 comprises a shift register having a bit number more than the number of the LEDs, and the LEDs 40 are connected to respective bits of the shift register. The LEDs 40 are controlled by the shift register in such a manner that each bit is set as "1" when turning on the corresponding LED 40 and is set as "0" when turning off the same. In order to set the shift register, the bit row is shifted one by one bit by the number of LEDs. In order to turn off all of them, all have to be cleared by "0". For example, when the unit of the shift register is of 8 bits, a number of shift registers for covering the necessary bit number are prepared and they are connected in series. When ON/OFF time is controlled through a provision of a timer, a control of flashing in a predetermined time interval can be realized, further, when the flashing interval is shortened extremely, such is seen for human eyes as if the LED were lighted continuously in a weak light, which saves the electric power.

The signal transmission and reception between the TR part 181 and the cabling work terminal device 16 as a superior PC (personal computer) is performed through wireless, the user operability is enhanced. In order to modify to wireless, as shown in FIG. 19, the LED controller 18 needs a power source such as a battery 184 and a wireless signal TR part 181. Thereby the volume of the LED controller 18 may increase. Therefore, if the LED controller is directly mounted on the RFID/LED plate 19, it may become difficult that the controller 18 may not be attached thereto because the controller may make an interference with other parts depending on the mounting position of the terminal block 20. For this reason, as shown in FIG. 19, when the LED controller unit 18 and the RFID/LED plate 19 are separated into two parts and the both are connected via a cable 186 so as to be determinable the positional relationship of the two freely, it is preferable that the LED controller 18 can be disposed at a position with no interference for the cabling work.

Further, when a plurality of types of LED controller 18 are prepared in view of the configuration of the terminal blocks 20 and of easy work, if the RFID/LED plate 19 is formed replaceably while separating the RFID/LED plate 19 and the LED plate controller 18, a possible cost increase can be suppressed.

In the LED controller 18, provided that the LED information obtaining part 182 is configured to get information as to a type of the RFID/LED plate 19 to be connected, when an mismatch type of the RFID/LED plate 19 is used in such a manner that the number of terminals 21 of the terminal block 20 for the work object is different from the number of such as LEDs 40 and RFIDs 21a, an error signal is generated, which contributes to advance the work with no confliction. For example, a determination as to whether or not mismatch between the LED controller 18 and the RFID/LED plate 19 is performed in the following manner. At first, all of the bits in the shift register are cleared to 0. Number of a counter is rendered to 0. A bit pushed out from a bit in the most significant digit is determined as the confirmation bit. A bit at first digit is set as "1" and bits following thereafter are set as "0", every time when shifting a bit row by one bit, the number of counter is advanced and whether or not the confirmation bit is 1 is confirmed. When the confirmation bit assumes "1", the number of the counter at that moment gives the bit number of the shift register and thereby the type of the RFID/LED plate 19 can be checked. For example, it is possible to design the system so that, when reading any one of RFIDs at the cable core side by the reader 15 at the time of a connection between a cable core and a terminal related to each other, the LED controller turns to the LED 40 for a specific RFID of the terminal related to the cable core of the read RFID. Thereby the worker can recognize the related terminal to be connected to the specific cable connecter with the read RFID easily and visually.

In the case of using the plate with at least RFID such as RFID plate or RFID/LED plate 19, provided that a step of inputting an ID 50 (refer to FIG. 50) of the terminal block 20 at the time of attaching the plate is added in the system, an erroneous attaching of the plate can be avoided. As one of the measures for avoiding the erroneous attaching of the plate, the following is proposed. For example, an RFID 50 (refer to FIG. 19) for indicating the terminal block 20 may be provided directly on the terminal block 20 beforehand. Thereby, the RFID 50 for the terminal block 20 can be read and confirmed when attaching the RFID plate or the RFID/LED plate on the terminal block 20, and thereby it is possible to confirm easily the terminal block 20 to allow the RFID plate or the RFID/LED plate to attach thereon. Alternatively, under a condition of waiting a menu of selecting a terminal block for work object, when an ID of the terminal block is input or the RFID 50 of the terminal block 20 is read, a procedure is shifted to the object work of the terminal block and an image of waiting the menu is displayed on the screen of the cabling work terminal device 16, that is also preferable. The IDs of RFIDs for indicating the respective terminals 21 on the terminal block 20 and the IDs of RFIDs provided on the RFID plate or the RFID/LED plate are registered with respect to a relative position in the plate in the cabling work terminal device 16 in advance. When each of the RFIDs 21a for terminals 21 on the terminal block 20 is read through the plate attached to the terminal block 20 with the reader 105 at the time of attaching the plate on the terminal block 20 or alternatively, when each of the IDs of the terminals 21 on the terminal block 20 is input directly, IDs in the RFIDs are related respectively to the terminals 21 in the terminal block 20, the terminals 21 coinciding relatively with the positions of the RFIDs in the plate.

Thereby, when using the RFID plate or the RFID/LED plate, the arrangement of attaching RFIDs to the each terminal directly is not necessitated and thereby cost reduction can be realized. Further, even when such a plate malfunctions, a substitute plate can be used, and thereby, the work efficiency can be enhanced.

A main processing unit 1 in FIG. 2 causes to display menus of "recording connecting conditions of cable core before disconnection for cable cores", "cable core connection for reinstatement" and "confirmation after cable core connection" necessary for a cabling work on a screen of the display 14. And then, when any one of the menu is selected by pressing an input tablet 13 by a worker's operation, the procedure is shifted to the selected menu. A data storage unit 10 is to store a template connection diagram as shown in FIG. 7 and data relating thereto.

Figure 7:
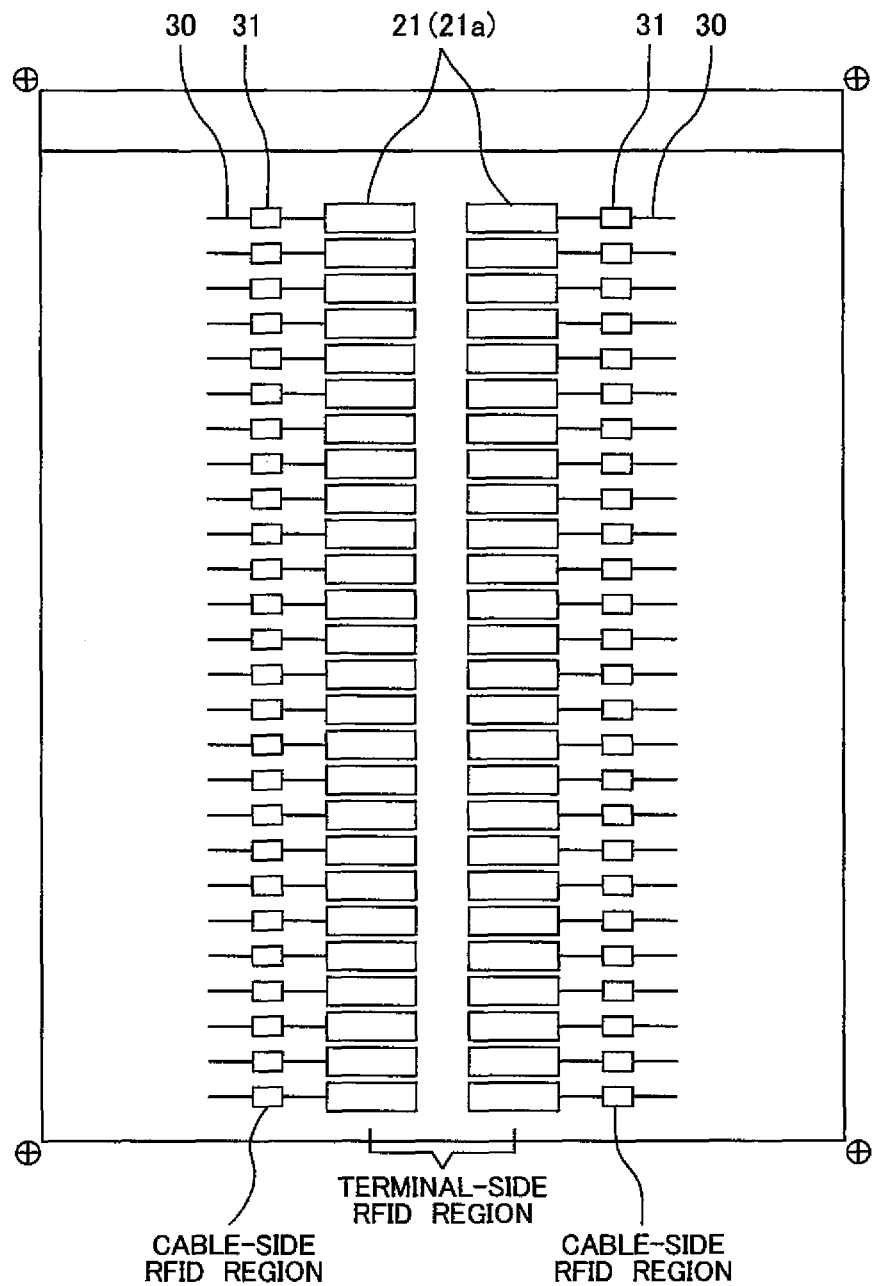
FIG. 7 is an example of template connection diagram.

FIG. 7 is a template connection diagram that is used for a terminal block 20 wherein terminals 21 are arranged in two in-line rows. Rectangular blocks arranged in two in-line rows at the center portion of the terminal block respectively show terminals 21 and RFIDs 21a assigned onto the terminals 21. Namely, these are of the regions for RFIDs at the terminal side. Each of the regions is also called as "terminal-side RFID region" or "first RFID region". Line components arranged at both sides of blocks 21 (terminal RFIDs 21a) of two in-line rows represent respective cable cores 30 (30-1-30-n) to be connected to terminals 21 (21-1-21-n), the rectangular blocks on the line components show RFIDs 31 (31-1-31-n) assigned to the cable cores 30. Namely, these are of regions for RFIDs at the cable side. Each of the regions is also called as "cable-side RFID region" or "second RFID region". This template defines a correspondence between the terminals and the cable cores to be connected to each other. Each of the terminals 21 and each of the cable cores 31 to be connected to each other, and each of the RFIDs 21a on the terminals 21 and each of the RFIDs 31 assigned to the cable cores 30 are shown as pairs to be connected.

According to the above-mentioned template, even when the terminals are used in one in-line row, it is possible to use this template by using only the one side of this template, therefore this template can be used commonly for a terminal block of terminals in one in-line row and in two in-line rows.

Figure 11:
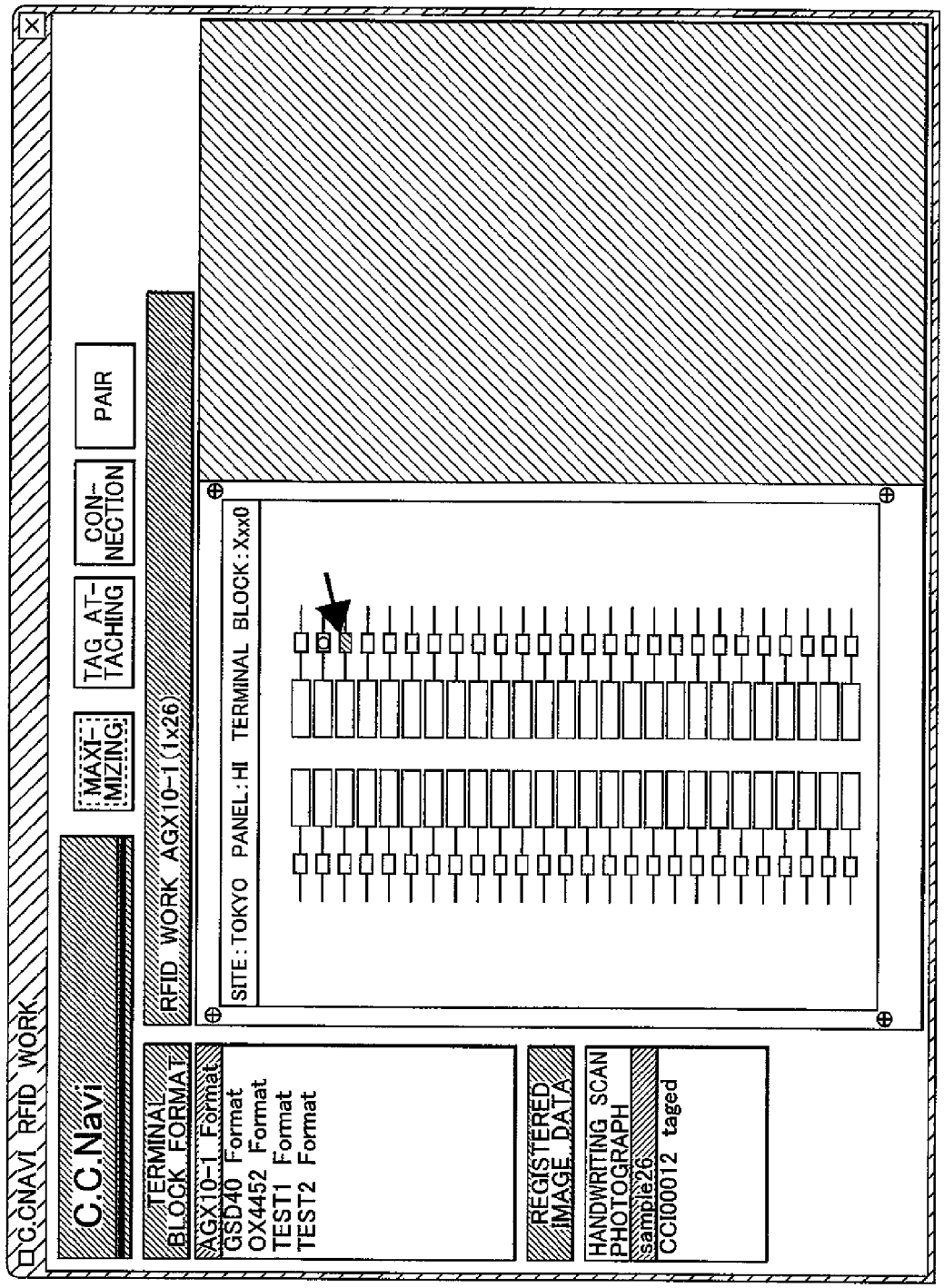
FIG. 11 is an example of an on screen image.

At the time of when processing a menu of "recording connecting conditions of cable core before disconnection for cable cores", a RFID region-ID relating part 4 in FIG. 2 causes to display the template connection diagram as shown in FIG. 7 on the screen 14. A template connection diagram shows a connection diagram common for cable connection diagrams in all types of terminal blocks. Namely, the template connection diagram indicates a diagram in which a plurality of pairs of a terminal and a cable core are arranged. When providing a specific name as to each of terminals and each of cable cores, and providing existence and nonexistence of cable connection into such a template connection diagram, a general connection diagram is constituted. An RFID region determination part 5 receives a coordinate position designated by a worker via the input tablet 13, determines which region in the template connection diagram is designated, and highlights the designated region by an arrow as shown in FIG. 11 as well as transfers information which region is designated to the RFID region-ID relating part 4. Instead of indicating by the arrow, the highlighting can be performed by changing the color. In the method of designating an RFID region from the screen, an advantage can be obtained that the work for designating the RFID region can be performed even without the RFIDs at the terminal side as in FIG. 3. Further, when the RFIDs at the terminal side are attached as in FIG. 3, instead of designating an RFID region from the screen, the operation for designating the RFID region can be performed by reading the RFID at the terminal side, thereby the operation is simplified. Namely, a simple operation of successively reading pairs of (RFID at the terminal side and RFID at the cable core side) is performed. Provided that the LEDs corresponding to RFIDs of the terminal side are attached at the terminal side, the system successively can determine RFID regions at the terminal side in a predetermined order by shifting turning on the LEDs in the predetermined order instead of reading RFIDs at the terminal side, thereby it is possible for the LEDs at the terminal side to prompt a worker to read in an RFID at the cable core side, the worker can complete the work only by reading in the RFID at the cable core side even without designating the RFID region from the screen as well as without reading the RFID at the terminal side in pair. Thereby, the worker can perform works such as which work is to be performed and which cable core is to be connected in an intuitively understandable manner. Further, the work efficiency is also enhanced.

At this time, it is preferable to display the portion related to an RFID on the screen 14 in a manner to be recognizable as the portion indicated by a circle in FIG. 11. FIG. 11 shows an image displayed, after name of site: Tokyo, panel ID: HI and terminal block: Xxx0 are inputted as properties. When an RFID attached to a cable is read by a reader 15 after the worker selects an RFID region, the RFID region-ID relating part relates the read ID number to the region. Further, when the region designated by the worker corresponds to a menu region for "name of site", "name of cable" and "name of cable core", texts inputted via such as a keyboard after the selection of a menu are stored in a data storage unit 10 as the respective properties. Thereby, the name of site and the name of cable can be confirmed on the screen, and an advantage can be obtained of preventing cable core connection errors even in the work thereafter.

FIG. 12 shows data after RFIDs and data having been inputted. When using the RFID/LED plate or the RFID plate in the cabling work, if the RFID of the plate self has been registered and in case a malfunction of the plate occurs, a same type new plate without the same RFID as that of the plate self cannot be replaced with the malfunctioning plate. Therefore, it is preferable that one what is registered at the time of processing menu of "recording connecting conditions of cable core before disconnection for cable cores" should be limited only to the relative position as to REFDs of terminals in the plate. Thus, when inputting an ID of the terminal block at the time of attaching the new plate with which the malfunctioned plate is replaced immediately before work of "cable core connection for reinstatement" or "confirmation after cable core connection", an ID in the RFID attached to the concerned relative position on the plate may be assumed as has been registered.

A terminal-cable core correspondence table preparing part 17 in FIG. 2 prepares correspondence data between RFIDs representing terminals to be connected and RFIDs at the cable side from RFID regions at cable side and RFID regions at terminal side on the template diagram and stores the correspondence data. The layout in the template diagram should be one that a worker can interpret likely as in the above. Then, for example, if RFIDs 1 attached to cables and information 1 including properties such as name of cable core are corresponded to the RFID regions at the cable side, and RFIDs 2 attached to the terminals and information 2 are corresponded to the RFID regions at the terminal side, a correspondence between terminals and cable cores that corresponds between RFID1 and RFID2, and information 1 and information 2 is prepared and is stored in the data storage part 10.

Figure 4:
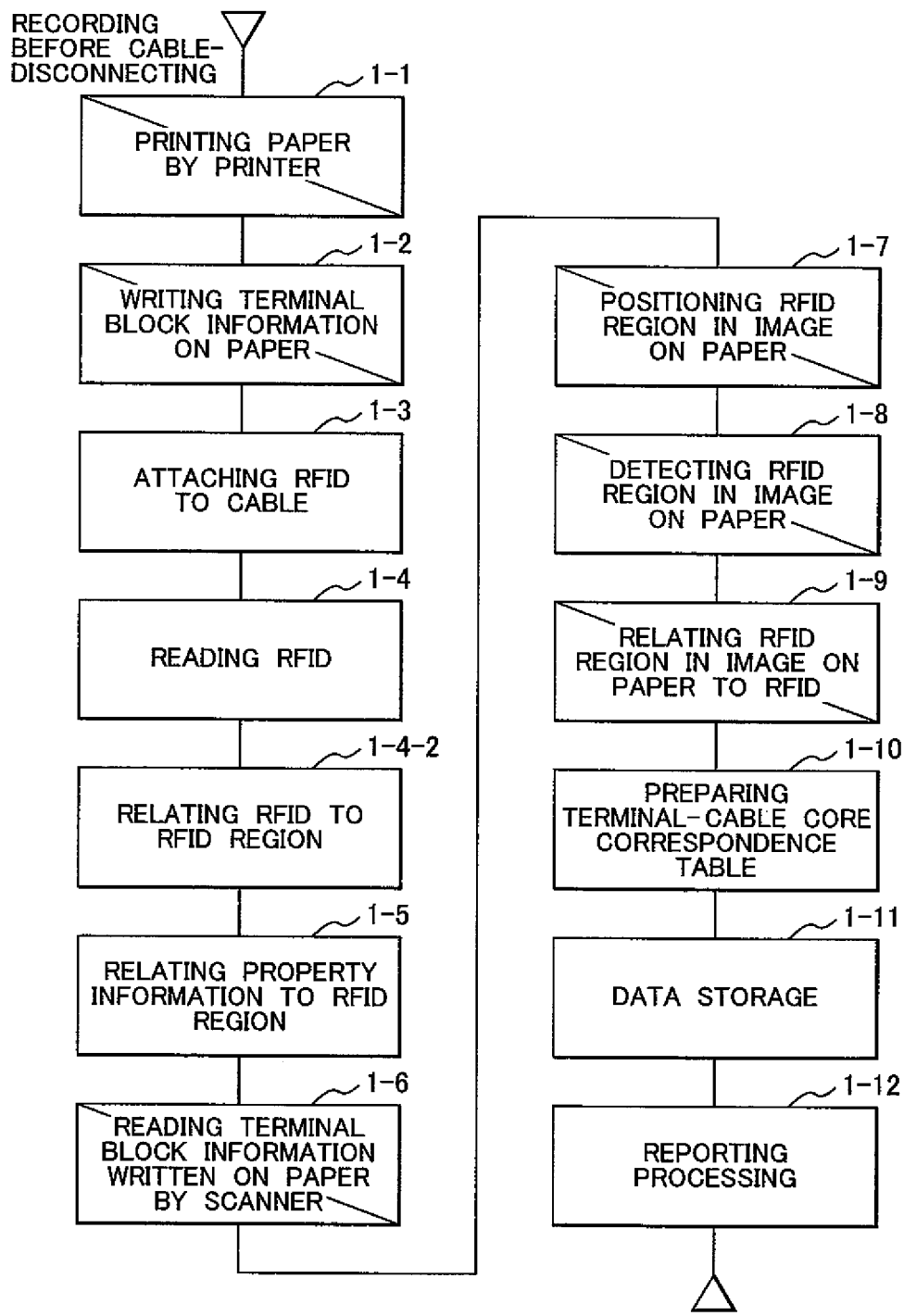
FIG. 4 is a workflow.

FIG. 4 shows a workflow of "recording connecting conditions of cable core before disconnection for cable cores". In FIG. 4, the embodiment 1 is constituted only by constitutional portions indicated by rectangular functional blocks with no diagonal line. The embodiment 2 in which functions are expanded is constituted by including the blocks each having the diagonal line in addition to the rectangular functional blocks of the embodiment 1. The embodiment 2 will be explained later.

Figure 8:
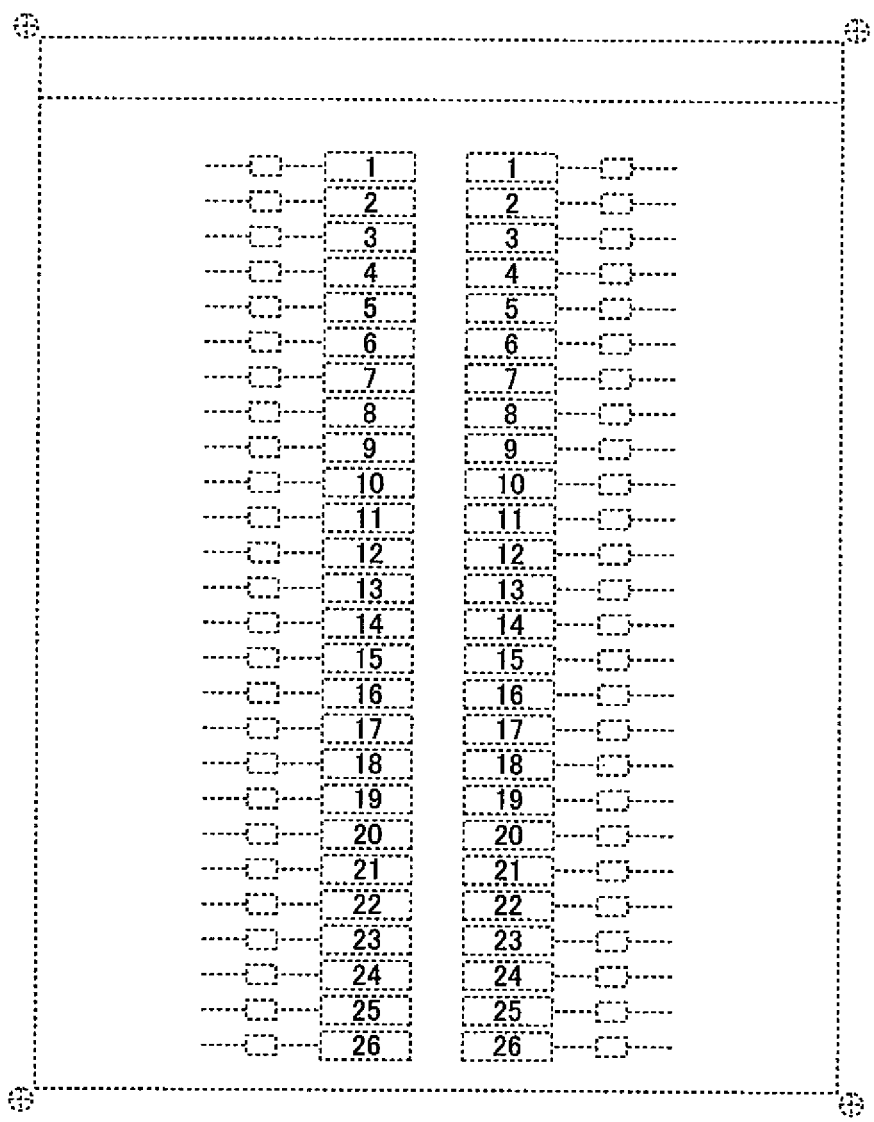
FIG. 8 is an example of memo written.

These steps in the workflow include steps performed by a worker and steps processed by the system. The worker attaches a RFID 31 to its corresponding cable core 30 respectively at a step 1-3, designates each of the RFID region at the cable core side in a template connection diagram displayed on the screen 14 of the cabling work terminal device 16 at a step 1-4, and reads the RFID 31 attached to the cable core 30. Thereby the read RFID is related to the designated RFID region at the cable core side and related to RFID region at the terminal side, at a step 1-4-2. Alternatively, provided that a RFID at the terminal side is read by using the RFID/LED plate 19 and reader 15 in addition to reading a RFID at the cable core side by reader 15, the cabling work is performed simply and easily. Namely, the reading of the RFID at the terminal side can be substituted for the designation of the RFID region at the cable core side to be connected thereto. Further alternatively, provided that: any of RFIDs 21a at the terminal side is designated in the system side; the LED 40 corresponding to the designated RFID 21a is controlled so as to be turned on; and its corresponding RFID 30 at the cable core side is read with reader 15 by the worker's operation while lighting the LED 40, the cabling work is performed simply and easily. Namely, by means of lighting an LED at a terminal designated from the system side, the RFID at the cable core side to be connected thereto is indicated, which substitutes for the designation of the RFID region at the cable core side. At step 1-5, the property information such as name of site, name of panel, name of terminal block, name of cable and name of cable core is related to RFID regions. Thereby, a cable connection diagram is completed. At this time, as show in FIGS. 7 and 8, the regions related to the RFIDs respectively are indicated by solid lines, and the regions not related are indicated by dotted lines. When a distinction as to whether or not to be the related regions is made by coloring, specific information as to where a cable is to be connected can be visibly recognized from on the screen, which facilitates the cabling work. At step 1-10, a correspondence table between terminals and cable cores is prepared. At step 1-10, the RFID regions on the template diagram and RFIDs in an inputted (read) image are corresponded, and as the result of the correspondence between the RFID regions and the RFIDs performed at step 1-10, a correspondence between RFIDs at the terminal side and RFIDs at the cable side can be obtained (an inputted image in FIG. 12). This is stored as a correspondence table in the data storage unit 10 at step 1-11 of data storing. Finally, a reporting process that reports the work completion is performed at step 1-12 to complete the workflow.

Namely, the cabling work aiding system is comprised of: the RFID reader 15 for reading the RFID 21a or 31 attached to at least one of the terminal 21, its terminal block 20, and the cable member such as cable core 30; and a cabling work terminal device 16 connected to the RFID reader 15. The cabling work terminal device 16 is comprised of: a data base 10 for recording a template connection diagram containing the terminal-side RFID region constituted by RFID data as to the terminal 21 and a cable-side RFID region constituted by RFID data as to the cable member 30; a relating part 4 for relating the RFID read by the RFID reader 15 to the terminal-side RIFD region and the cable-side RIFD region defined in the template connection diagram; a terminal-cable member correspondence table preparing part 17 for preparing a correspondence table for leading correspondence between the RFID data as to the terminal and RFID data as to cable member from correspondence between the terminal-side RIFD region and the cable-side RFID related by the RFID read by the RFID reader.

In the menu processing of "cable connection" such as reinstatement, when the worker reads an RFID, an RFID region detecting part 6 from ID in FIG. 2 detects to which RFID region the read RFID is related, an on-screen calling part 8 displays an image including the related RFID region on the screen 14, and an on-screen RFID region highlighting part 7 highlights the RFID region such as by changing color of the RFID region. For example, when an RFID attached on a cable is read, a terminal to be connected can be indicated with the highlight on the screen. At this time, when LEDs are provided near at the respective terminals and an LED of a terminal to be connected is lighted, the work efficiency is enhanced.

Figure 5:
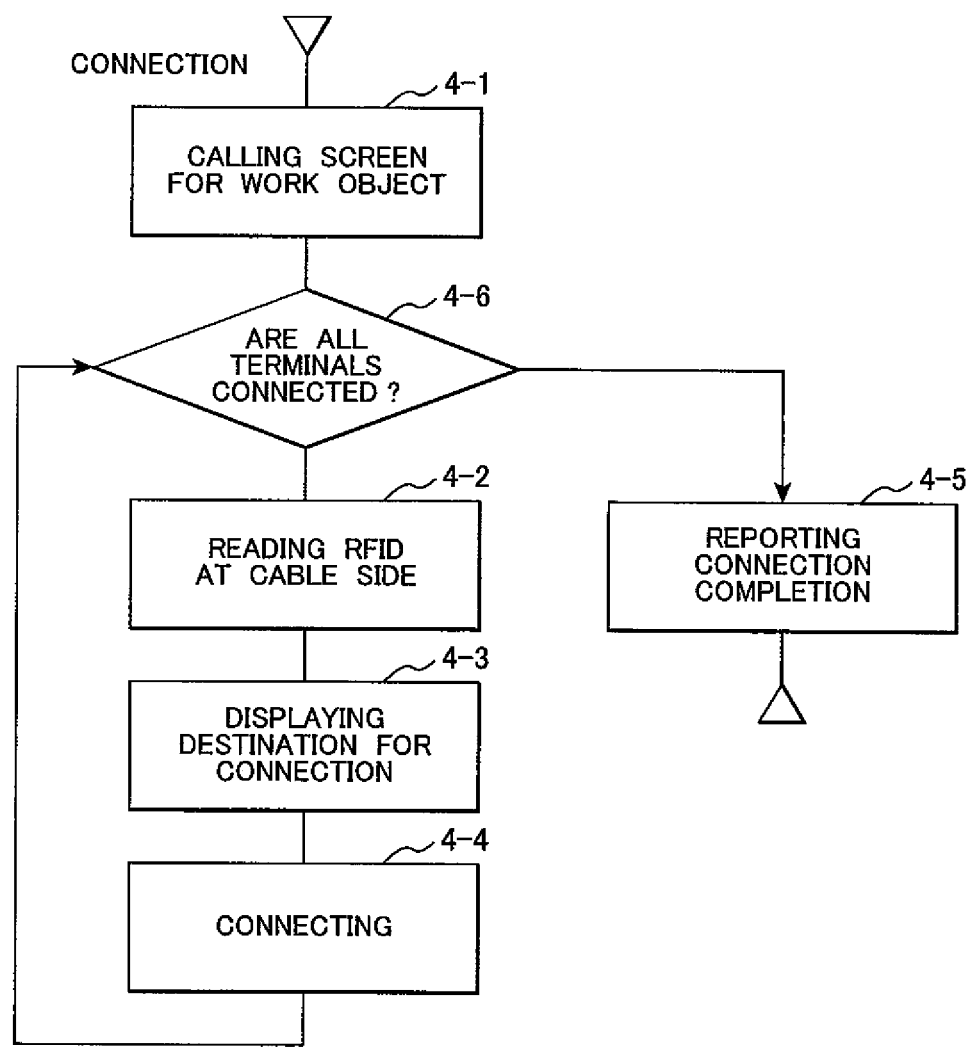
FIG. 5 is a workflow.
Figure 13:
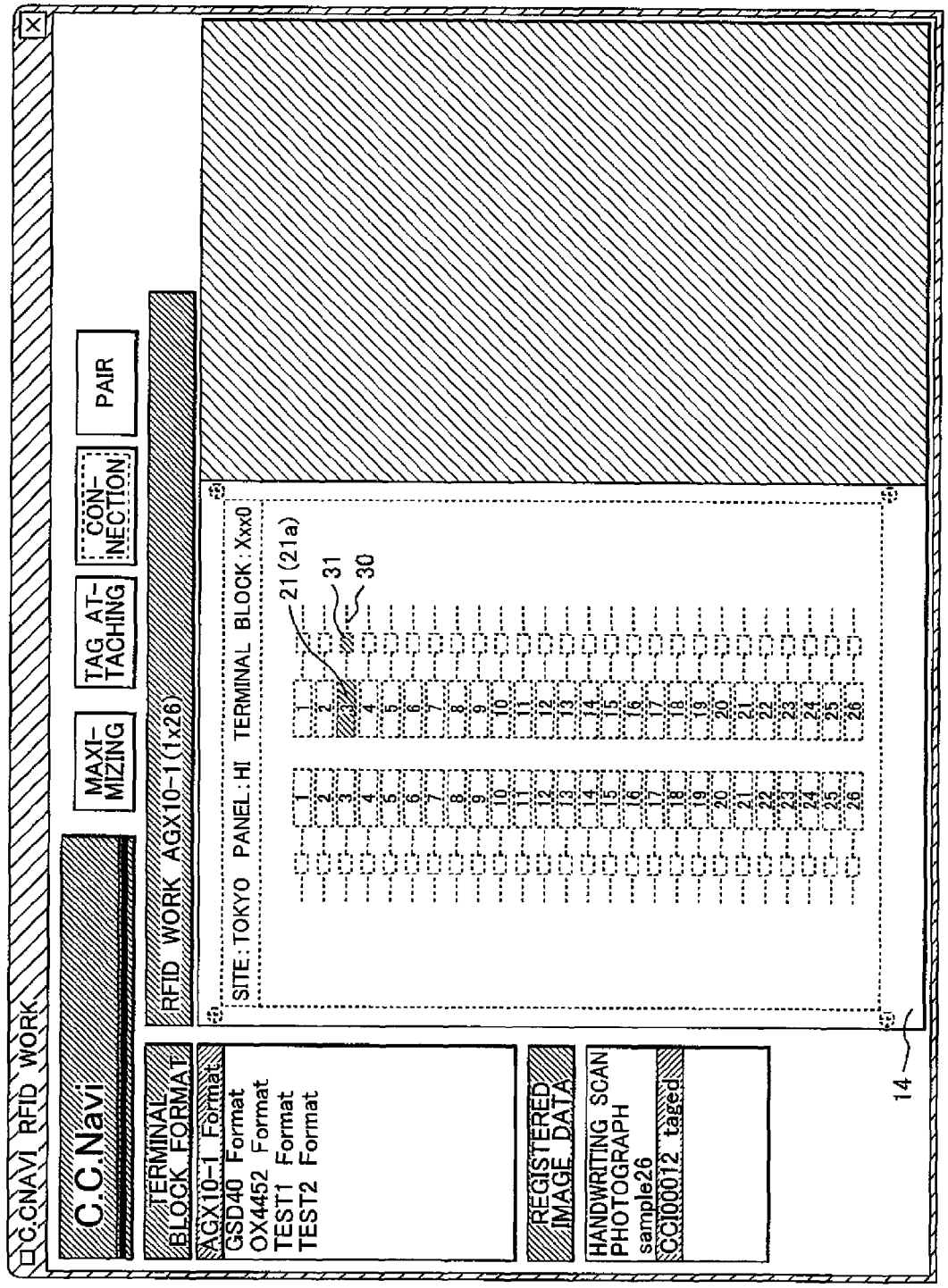
FIG. 13 is an example of an on screen image.

FIG. 5 shows a workflow for the cable connection. These steps in the workflow include steps performed by a worker and steps processed by the system. At step 4-1, the worker calls a screen for work object among menu processing of "cable connection", as an example, this is performed by attaching the RFID/LED plate 19 and by inputting an ID of the terminal block for the work object. This also can be performed by designating an ID of a cable core or by reading an RFID attached. Until whether all of the terminals have been connected is confirmed at step 4-6, steps from 4-2 to 4-4 below are repeated. When an RFID at the cable side is read at step 4-2, the system indicates a destination to be connected. Namely, as shown on the display screen 14 in FIG. 13, to which terminal the cable is to be connected is shown by highlighting the concerned portion on the inputted image. In place of the input image as shown in FIG. 13, the concerned portion can be displayed by highlighting on the template diagram as shown in FIG. 7 in the screen 14 together with the property data. In the case where RFID/LED plate 19 are attached, when an LED next to a concerned terminal is lighted to indicate the terminal directly, the work can be performed in an easily understandable manner. At step 4-4, the worker connects a cable core to a position indicated by the system. When it is confirmed whether all of the terminals have been connected at step 4-6, a connection completion reporting is performed at step 4-5. More specifically, such an operation is performed that with a connection work uploading menu, the read history is transferred to a superior system. By keeping the read time when the connection of the object cable is performed as a history, reliability is enhanced. Before beginning a work, when data that clarifies who performs the work is logged in, even the data about who performed the work can be left as a history.

In the menu processing of "confirmation", after connecting a cable to a terminal, it is confirmed whether the connection is correct, in that when the worker successively reads an RFID at the terminal side and an RFID at the cable side, the system judges whether the two RFIDs correspond to the RFIDs of the terminal and the cable to be connected and displays the result on the screen 14, alternatively, the correctness and incorrectness is informed to the worker by sound. Thereby, the worker can easily recognize such as which work is to be done next and which wire is to be connected. Further, the work efficiency is also enhanced.

With regard to the terminal and the cable having been determined as connected correctly in the previous confirmation, when the connection is reconfirmed days after, the connection is sometimes changed differently from the previous one. In such instance, it is preferable that the connection data can be renewed according to the actual connection through a provision of a renewal menu. Specifically, contents of a concerned field in {cable information, rectangular region, RFID} in FIG. 10 are rewritten. The $i^{th}$ field in RFID region information at the cable side corresponds to the $i^{th}$ field in RFID region information at the terminal side. The field "i" is overwritten by the field j related to the RFID of a cable corresponding to the $i^{th}$ field in the current RFID region information at the terminal side. At this time, when the information of field "I" is stored there after adding a field with no connection, and when the same is connected to another terminal, the data can be copied to a predetermined field. At a time of data renewal, when such operation is permitted in accordance to the authority of the worker, data renewal by a person with no authority can be avoided and reliability is ensured. Further, since the latest condition is kept, such as work duplication and erroneous wiring due to old data can be prevented.

Figure 6:
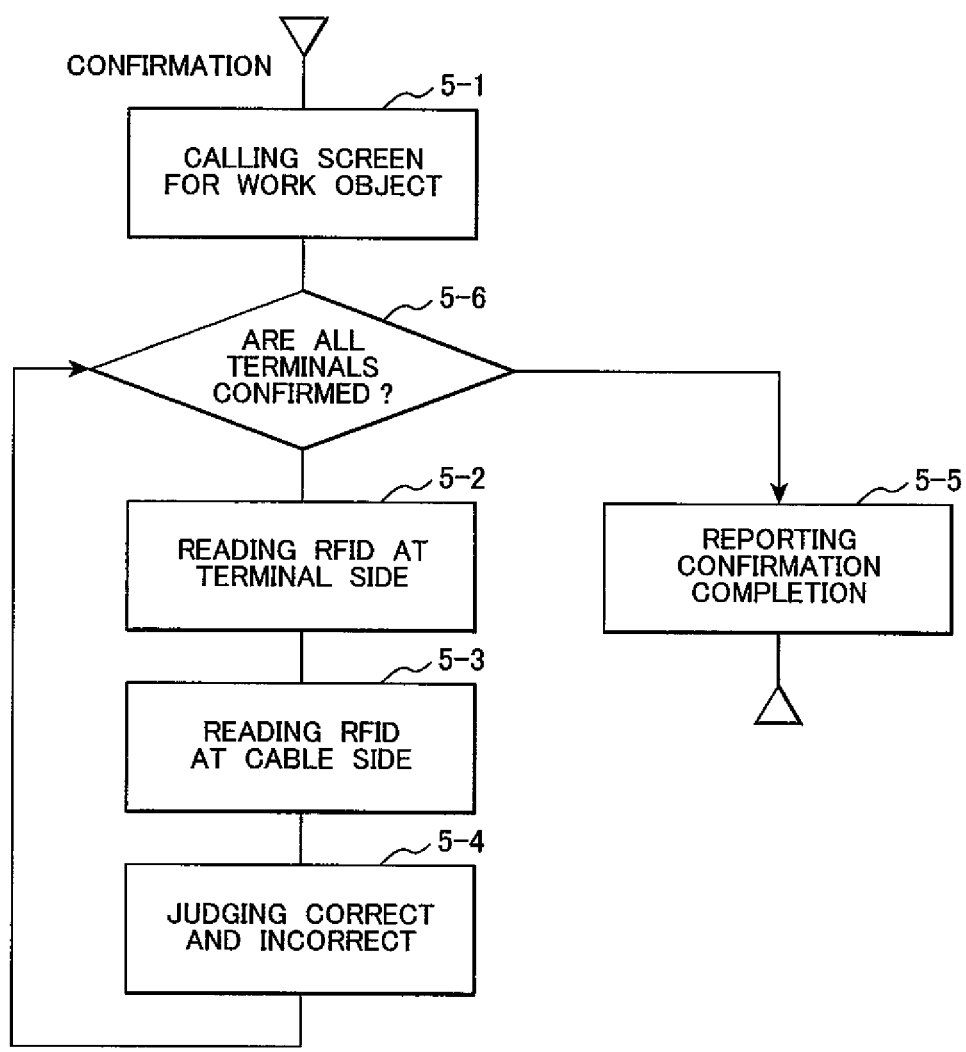
FIG. 6 is a workflow.

FIG. 6 shows a workflow for confirmation of the cable connection. These steps in the workflow include steps performed by a worker and steps processed by the system. At step 5-1, a screen of the work object is called from the menu processing of "confirmation". This operation is the same as the connection processing as explained in connection with FIG. 5. Until whether all of the terminals have been connected is confirmed at step 5-6, steps from 5-2 to 5-4 below are repeated. In the case of using the RFID/LED plate 19, an RFID at the terminal side is read through the RFID/LED plate 19 at step 5-2, and when an RFID assigned at the cable side is successively read at step 5-3, in order to judge correctness and incorrectness at step 5-4, the system obtains the correspondence between the RFIDs at the terminal side and the RFIDs at the cable side with reference to the data prepared at step 1-10 in FIG. 4 and performs the correctness and incorrectness judgment in such a manner that when the pair read in steps 5-2 and 5-3 are included in the correspondence, correctness is judged and when not included, incorrectness is judged, and the result is indicated to the worker. If the result is incorrect, the worker confirms the connection, corrects the connection and performs again the confirmation processing. When it is confirmed that all of the terminals have been connected correctly at step 5-6, a correct and incorrect judgment result is reported as confirmation completion at step 5-5. More specifically, such an operation is performed that, with a confirmation work uploading menu, the correct and incorrect judgment result is transferred to a superior system, which is the same as in the case of the connection menu.

A collating part 9 between RFID region and ID in FIG. 2 causes to indicate an RFID region and subsequently collates whether the read RFID is related to the RFID region indicated previously, and to inform the result to the worker. This is a function that is used when the worker confirmed the object while looking at a drawing.

Functions of a printer 11 and a scanner 12 as shown in FIG. 2 are used by connecting the same to the cabling work terminal device 16 via a cable.

Figure 9:
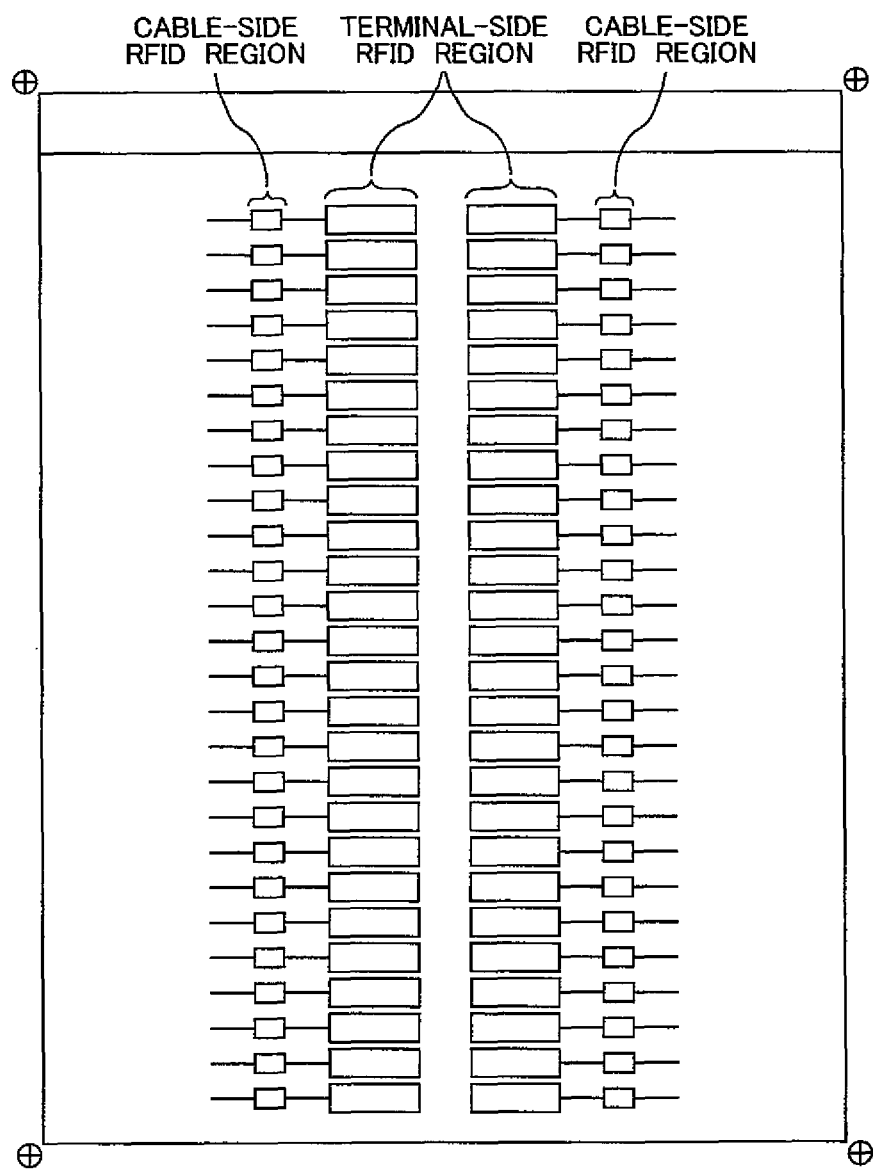
FIG. 9 is an example of template connection diagram.

Although the template connection diagram in FIG. 7 shows the connection in an easily understandable manner when cables are connected to a general terminal block in which terminals are aligned in right and left two in-line rows, it is preferable to prepare several types of template connection diagrams having such as different vertical directions and number of rows. Further, in the template connection diagram in FIG. 7, the RFID regions at the cable side and the RFID regions at the terminal side are defined beforehand as shown in FIG. 9, and these are candidate regions to be related later to RFIDs. FIG. 10 shows data belonging to the template connection diagram. For example, a drawing table with drawing table ID of Xxx0.bmp indicates a terminal block with terminal block ID of Xxx0, the RFID regions at the cable side included in the drawing table Xxx0.bmp are held in a rectangular region in a separate table, in which cable information added afterward and a correspondence with the related RFIDs are held. Likely, the RFID regions at the terminal side included in the drawing table Xxx0.bmp are held in a rectangular region in a separate table. With this table the RFID regions at the cable side and the RFID regions at the terminal side are corresponded, which is interpreted as suggesting to connect the corresponded terminals and cable cores during the work. When an RFID attached to a cable is corresponded to an RFID region at the cable side and an RFID attached to a terminal is also corresponded to an RFID region at the terminal side, and when the two RFIDs are read to judge whether the same are those attached to the terminal and the cable core to be connected, an erroneous connection can be avoided. With regard to the format in FIG. 10, other than the above, a region ID in a template connection diagram can be used in place of the rectangular regions. At this instance, when the RFID regions at the terminal side and the RFID regions at the cable side are displayed at corresponding positions on the screen, the worker can easily image the actual terminals and cable cores, which enhances work efficiency.

Embodiment 2

The embodiment 2 of the present invention will be explained herein below. As described in the embodiment 1, if FIG. 2, the embodiment 2 includes the blocks 2, 3, 11, 12 and 13 each having the diagonal line in addition to the rectangular functional blocks of the embodiment 1 to expand functions of the system. That is, the block 2 is of a positioning processing unit, the block 3 is of a RFID region detecting part, the block unit 12 is of a scanner. Incidentally, the embodiment 2 has the above-mentioned constitution, functions, advantages, and further the following additional constitution, functions, and advantages. Therefore, the followings are explained only about features different from the embodiment 1, and the common features with the embodiment 1 are omitted.

Figure 14:
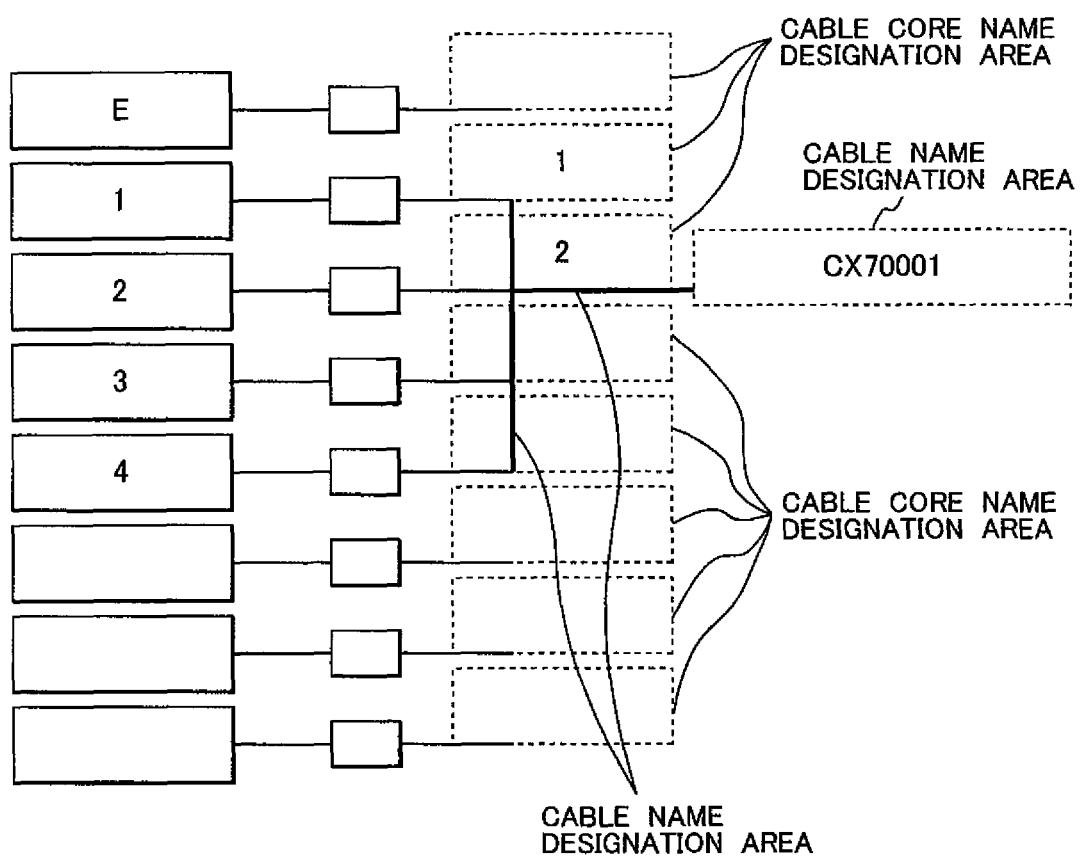
FIG. 14 is an example of operation.

FIG. 14 shows an example in which an operation of inputting respective properties is performed for the template diagram. Cable core name inputting areas are shown near the line components representing the cable cores, and at the time of property inputting mode, after selecting such an area, when a text is inputted, a name of a cable core is designated. Further, as an example of operation of inputting a corresponding information between cable cores and cables formed by bundling the cable cores, when lines perpendicular to the lines indicating cable cores are inputted, these are registered as bundled cables, and a cable name designation inputting area is automatically generated, in which a text is inputted as a name of the cable. When a leading line for the line is automatically generated also at a position near to the input or the name of the cable, the correspondence with the name of the cable is displayed in an easily understandable manner. Thereby, such as an erroneous work is reduced and work efficiency is enhanced.

Further, when a worker writes a memo on a paper that is a printed out of the template diagram by a pencil or a ball point pen, after causing to read the same by a scanner, and causes to store the same after adding an image ID (as an example shown in FIG. 8), and thereafter starts a positioning processing part 2 in FIG. 2 and inputs the panel ID and the image ID, the image designated by the image ID is positioned with the template diagram, and an RFID region detecting unit 3 seeks a correspondence between the RFID region in the image and an RFID region in the template diagram, and generates data in which an RFID related to an RFID region in the template diagram is assumed as related to the RFID region in the image and causes to store the same in the data storage unit 10.

FIG. 4 shows a workflow of recording before cable-disconnection. These steps in the workflow include steps performed by a worker and steps processed by the system. The worker prints out a copy of the template diagram as shown in FIG. 7 via a printer at step 1-1, at step 1-2, writes in terminal block information on the copy with reference to the terminal block at the site, at step 1-3, attaches an RFID to a cable and after reading the RFID at step 1-4, the same is related to an RFID region. At this time, as indicated previously, when the RFID/LED plates are used, the work can be performed simply and easily. At step 1-5, the property information such as name of site, name of panel, name of terminal block, name of cable and name of cable core is related to RFID regions. Thereby, a cable connection diagram is completed. Then, the worker returns to his office from the site, and causes to read by the scanner the copy in which the terminal block information prepared and written at step 1-2 at step 1-6 and causes to store the same while adding a proper image name. At step 1-7, positioning of the RFID regions on the copied image is performed. At step 1-7, the function of the positioning processing part 2 in the system is called and when the image read at step 1-6 is designated, detection of the RFID regions of the image on the copy is automatically performed at the system side at step 1-8. For example, at four corners on the template diagram as shown in FIG. 7 registration marks are added beforehand, from the four corners of the read image (herein after will be called as input image) the registration marks are sought, and the image is rotated, moved, enlarged or reduced so as to coincide with the registration marks of the original image. After the positioning, the respective RFID regions on the input image coincide with the respective RFID regions on the original image. Even when there are no registration marks, a similar positioning can be performed by extracting four corners of the RFID regions at the cable side. Relating of the RFID regions of the image on the copy to the RFIDs at step 1-9 is also performed automatically at the system side. The RFIDs allotted to the RFID regions on the template image are registered to the respective RFID regions on the input image. At step 1-10, a correspondence table between terminals and cable cores is prepared. At step 1-6, the RFID regions on the template diagram and RFIDs in the inputted image are corresponded, and as the result of the corresponding between the RFID regions and the RFIDs performed at step 1-7, a correspondence between RFIDs at the terminal side and the RFIDs at the cable side can be obtained (an inputted image in FIG. 12). This is stored as a correspondence table in the data storage unit 10 at step 1-11 of data storing. Finally, a reporting process that reports the work completion is performed at step 1-12 to complete the workflow. Thereby, with the simple method the data (such as the cable connection diagram) can be prepared. Further, the work time can be reduced and the work efficiency is enhanced.

In the menu processing of "cable connection", when the worker reads an RFID, an RFID region detecting unit 6 from ID in FIG. 2 detects to which RFID region the read RFID is related, an on screen calling unit 8 displays an image including the related RFID region on the screen 14, and an on screen RFID region highlighting unit 7 highlights the RFID region such as by changing color of the RFID region. Further, other than a simple use of FIG. 11 at the time when the RFID is related, when a worker writes a memo on a paper that is a printed out of the template diagram by a pencil or a ball point pen, and with the image read by the scanner, when the corresponding RFID region is indicated, the work is facilitated for the worker. Further, the image can be displayed in an overlapping manner.

Embodiment 3

Different from the constitution in embodiment 1, herein below, an example of an operation is shown in which corresponding information between cable cores and cables formed by bundling cable cores is inputted. FIG. 14 shows an example of inputting operation of respective properties for the template diagram. A cable core name inputting regions are shown near the line components representing the cable cores, and at the time of property inputting mode, after selecting such region, when a text is inputted, a name of a cable core is designated. Further, as an example of operation for inputting a corresponding information between cable cores and cables formed by bundling the cable cores, when lines perpendicular to the lines indicating cable cores are inputted, these are registered as bundled cables, and a cable name designation inputting area is automatically generated, in which a text is inputted as a name of the cable. When a leading line for the line is automatically generated also at a position near to the input or the name of the cable, the correspondence with the name of the cable is displayed in an easily understandable manner. Thereby, such as an erroneous work is reduced and work efficiency is enhanced.

Embodiment 4

Figure 15:
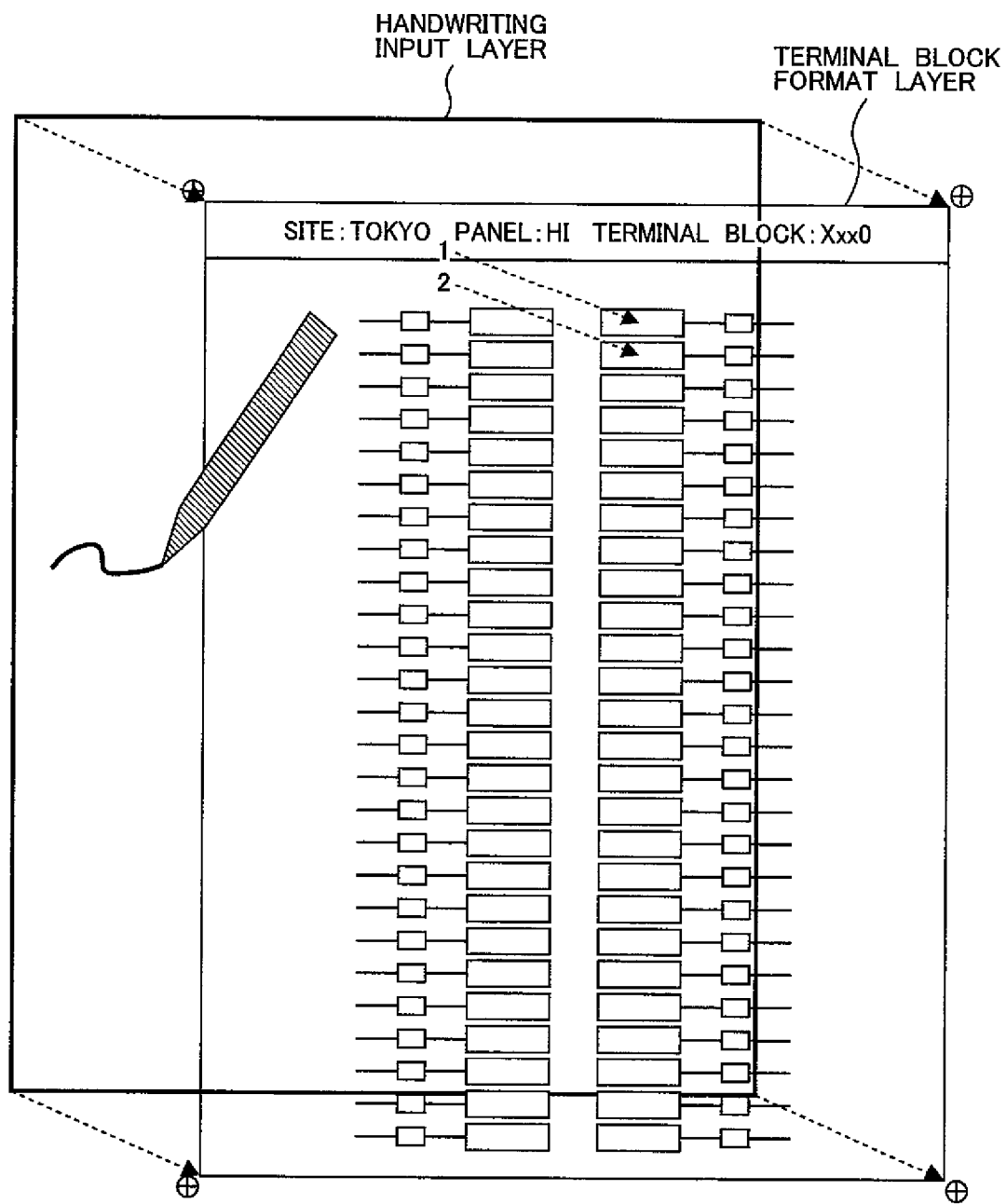
FIG. 15 is a view for explaining an alternative measure.

Different from the constitution in embodiment 2, FIG. 15 shows an alternative measure for the method in which during the menu processing of "recording before cable-disconnection" a scanner reads a memo on a paper written by a worker.

When the worker indicates a handwritten memo input mode on a screen for relating to RFIDs as shown in FIG. 15, a memo input layer is rendered to an input acceptable condition, and the worker can freely write memo thereon. With this method, time and labor of reading a paper afterward by a scanner can be saved. The operations in the works such as for the relating RFID regions to RFIDs, the connection and the confirmation can be performed as those in embodiment 2 as shown in FIG. 2.

Embodiment 5

Figure 16:
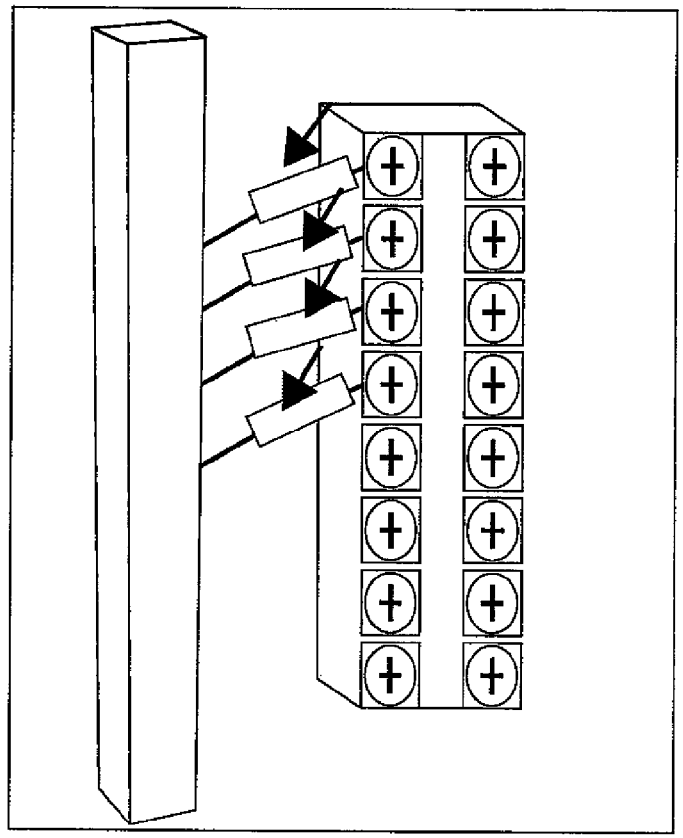
FIG. 16 is a view for explaining an alternative measure.

Different from the constitution in embodiment 2, FIG. 16 shows another alternative measure for the method in which during the menu processing of "recording before cable-disconnection" a scanner reads a memo on a paper written by a worker. FIG. 16 is an image of a terminal block photographed, when the worker designates such as RFID regions at the cable side and RFID regions at the terminal side for this image, the respective RFID regions are defined. Instead of such designation, when RFIDs having a unique configuration are attached, and when candidate RFID regions are automatically extracted through an image processing from an image photographed after the attachment of such RFIDs, a correct RFID region in the image can be obtained when the worker designates the position nearby but not the correct position of the RFID region. In FIG. 16, four portions designated as the RFID regions are indicated by arrows. The operations in the works such as for the relating RFID regions to RFIDs, the connection and the confirmation can be performed as those in embodiment 2 as shown in FIG. 2. Thereby, with further simplified method the data can be prepared, and amount of work can be lightened.

Embodiment 6

Figure 17:
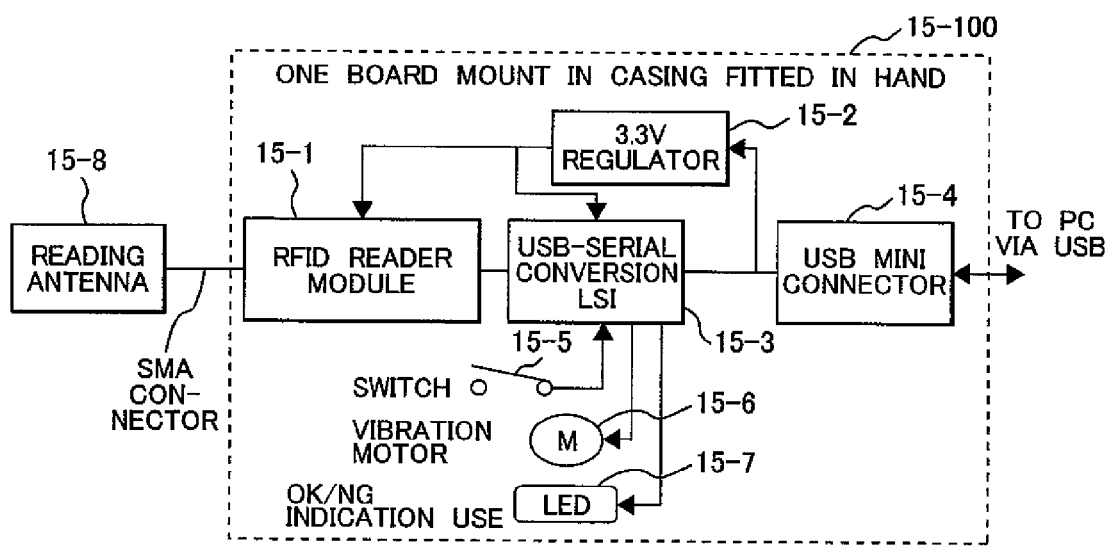
FIG. 17 is a view for explaining a reader.
Figure 18:
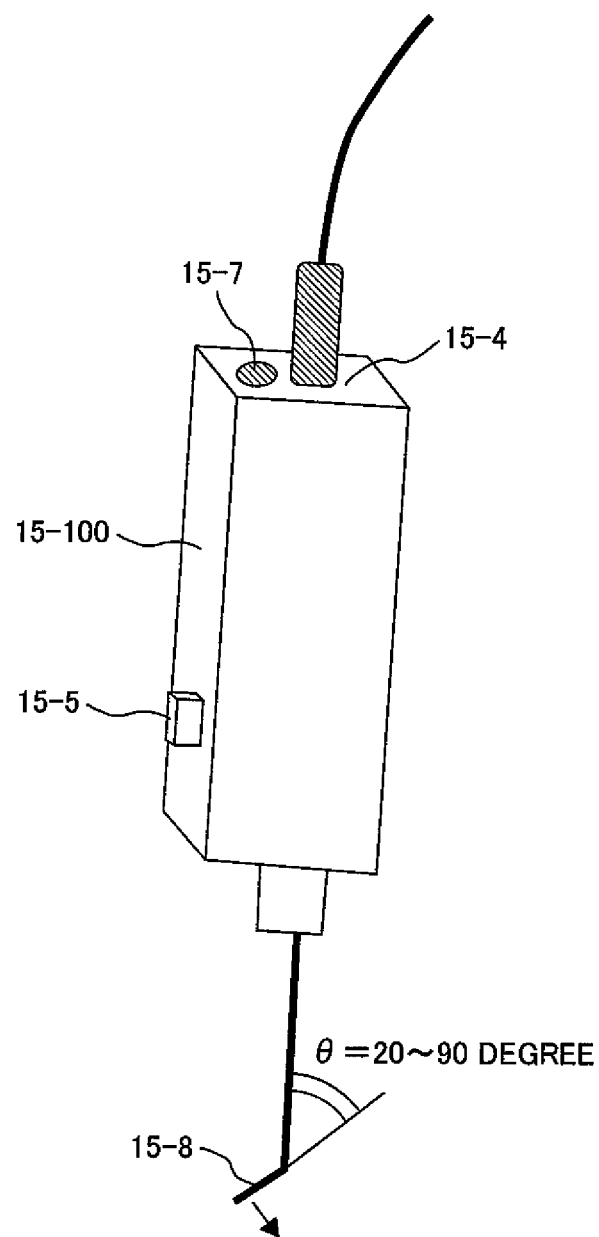
FIG. 18 is a view for explaining a reader.

A reader 15 that is suitable for any of the systems in the above embodiments will be explained with reference to FIGS. 17 and 18. Further, the present embodiment is an example of such suitable readers, and embodiments are not limited thereto. FIG. 17 shows a hardware constitution and FIG. 18 shows an outlook thereof. The followings are included in a substrate accommodated in a casing 15-100 that fits within a hand. An USB-serial conversion LSI 15-3 is used for connection to an external PC as well as receives power, and is controlled by the external PC. A 3.3 V regulator 15-2 rectifies a power supplied. When a command to read is received from the external PC via the USB-serial conversion LSI 15-3, the command is transferred to an RFID reader module 15-1, and the RFID reader module 15-1 generates a read command and transmits radio waves from a read antenna 15-8. Thereafter, the read antenna 15-8 receives a signal from an RFID and transfers the same to the RFID reader module 15-1, and the RFID reader module 15-1 analyzes the signal and informs the analyzed result to the external PC via the USB-serial conversion LSI 15-3. When received a command to light an LED from the external PC, the LED is lighted. When received a command to vibrate from the external PC, a vibration motor 15-6 vibrates. When a switch 15-5 is pressed, a signal is transmitted to the external PC. When an LED is lighted or the vibration motor is vibrated at the time when the external PC receives a read command result, the worker can recognize the read result without looking at the screen, which facilitates the work. Alternatively, when the external PC causes to light an LED in predetermined manners or causes to vibrate the vibration motor in predetermined manners (to vibrate for a predetermined long time, to vibrate in a plurality of times for a short time or the combination thereof) depending on the read result indicating whether the connection is correct or incorrect, the worker can recognize the correctness and incorrectness of the work without looking at the screen, which facilitates the work.

As shown in FIG. 18, when the read antenna 15-8 is constituted in such a manner that the top end of the antenna is bent so that an easy readable face of the antenna directs downward, when the antenna main body is griped like a pen, advantages are obtained that an RFID attached to a cable core can be easily read and the easy readable face of the antenna can be easily recognized, which facilitates the work. When producing an antenna with a substrate, if the corners thereof are rounded, parts are hardly damaged even if the corner inadvertently touches the parts. Further, for the purpose of a cabling work, when the antenna 15-8 is covered by an electrically insulative resin, no problem with regard to safety arises, even if the antenna inadvertently touches to a portion applied of a voltage.

What is claimed is:

1. A cabling work aiding system, that creates a terminal-cable member corresponding table that indicates a correspondence between an RFID of a terminal and an RFID of a cable member, in order to assist in performing cabling work for connecting the cable member to the terminal, the cabling work aiding system comprising:
    an RFID reader configured to read the RFID of the terminal and the RFID of the cable member and
    a cabling work terminal device connected to the RFID reader, the cabling work terminal device comprising:
        a database configured to store a template connection diagram used as a template for preparing a connection diagram indicating a connection between the terminal and the cable member, wherein the template connection diagram contains:
- a terminal-side RFID region including spaces configured to store therein information pertaining to the RFID attached to the terminal,
- a cable-side RFID region including spaces configured to store therein information pertaining to the RFID attached to the cable member, and
- information relating the terminal-side RFID region and the cable-side RFID region to each other;

a display, including a screen, configured to display the template connection diagram;

a user interface configured to designate a position displayed on the screen of the display, for the RFID of the terminal to be entered into a terminal-side RFID region of the template connection diagram, and to designate a position displayed on the screen of the display, for the RFID of the cable to be entered into a cable-side RFID region of the template connection diagram;

a relating part configured to, when attaching the RFIDs to the cable member and the terminal, enter and relate in the template connection diagram, respectively, the RFID of the terminal read by the RFID reader at the designated position in the terminal-side RFID region of the template connection diagram, and the RFID of the cable member read by the RFID reader at the designated position in the cable-side RFID region of the template connection diagram, and a terminal-cable member correspondence table preparing part configured to prepare the terminal-cable member correspondence table from the RFID of the terminal entered in the terminal-side RFID region, the RFID of the cable member entered in the cable-side RFID region, and the information relating, by the relating part, the terminal-side RFID region and the cable-side RFID region to each other in the template connection diagram.

2. A cabling work aiding system according to claim 1, further comprising:
an additional information part configured to add information to the terminal-side RFID region and the cable-side RFID region in the template connection diagram.

3. A cabling work aiding system according to claim 2, the work aiding system further comprising:
an RFID region highlighting part configured to highlight the related terminal-side and cable-side RFID regions while displaying the template connection diagram and the additional information, when the RFIDs to be related to the terminal-side RFID region and the cable-side RFID region in the template connection diagram, respectively, are read by the RFID reader.

4. A cabling work aiding system according to claim 2, further comprising:
a positioning processing part configured to:
perform a positioning process to prepare a first drawing, containing the terminal-side and cable-side RFID regions related to the RFID read by the RFID reader, and a second drawing that is read by a scanner of revised result having added on a printed paper of the first drawing,
carry out positioning the terminal-side and cable-side RFID regions of the first drawing with the terminal-side and cable-side RFID regions of the second drawing, thereby comparing between both the RFIDs with the positioning, and extract a correspondence between these regions, and
an RFID region highlighting part configured to highlight the terminal-side and cable-side RFID regions of the second drawing, which are corresponded to the terminal-side and cable-side RFID regions of the first drawing by the positioning processing part, while displaying the second drawing, when the RFIDs related to the terminal-side and cable-side RFID regions of the first drawing are read by the RFID reader.

5. A cabling work aiding system according to claim 2, wherein the additional information part is configured to provide an inputting region overlapped on the displayed template connection diagram so that the inputting region accepts a memo written therein.

6. A cabling work aiding system according to claim 2, wherein the additional information part is configured to input text, item by item, for the respective RFID regions in the template connection diagram.

7. A cabling work aiding system according to claim 2, wherein a shape and a positional coordinate of each RFID region in the template connection diagram are determined in advance, with reference to a reference position in the diagram.

8. A cabling work aiding system according to claim 2, further comprising:
an RFID confirmation requesting part configured to indicate the RFID region related to the RFID read by the RFID reader, when a cable-terminal connection situation is changed, and
a cable-terminal renewing part configured to perform a renewing process including: reading RFIDs assumed to be originally related to the terminal-side and cable-side RFID regions indicated by the RFID confirmation requesting part, and when the read RFID is not the same as the original RFID, recognizing that the cable-terminal connection situation has changed, and renewing the cable-terminal connection data so that a pair of the RFIDs at the terminal side and the RFID at the cable side is corrected.

9. A cabling work aiding method, for preparing a terminal-cable member correspondence table that indicates a correspondence between an RFID of a terminal and an RFID of a cable member, the cabling work aiding method comprising:
storing, in a database of a cabling work terminal device, a template connection diagram containing:
- a terminal-side RFID region including spaces configured to enter therein data pertaining to an RFID attached to the terminal,
- a cable-side RFID region including spaces configured to enter therein data pertaining to an RFID attached to the cable member, and
- information relating the terminal-side RFID region and the cable-side RFID region to each other,
wherein the template connection diagram is used as a template to prepare a connection diagram indicating a connection between the terminal and the cable member;

displaying the template connection diagram, on a screen of a display of the cabling work terminal device;

designating, through a user interface, a position displayed on the screen of the display, for the RFID of the terminal to be entered into a terminal-side RFID region of the template connection diagram, and to designate a position displayed on the screen of the display, for the RFID of the cable to be entered into a cable-side RFID region of the template connection diagram;

respectively entering and relating in the template connection diagram, when attaching RFIDs to the cable member and the terminal, the RFID of the terminal read by an RFID reader at the designated position in the terminal-side RFID region of the template connection diagram, and the RFID of the cable member read by the RFID reader at the designated position in the cable-side RFID region of the template connection diagram, and preparing, by use of the cabling work terminal device, the terminal-cable member correspondence table, by using the RFID of the terminal entered in the terminal-side RFID region, the RFID of the cable member entered in the cable-side RFID region, and the information configured to relate the terminal-side RFID region and the cable-side RFID region to each other in the template connection diagram.

10. The cabling work aiding method according to claim 9, wherein information is added to the terminal-side region of the template connection diagram, and to the cable-side RFID region of the template connection diagram.

11. The cabling work aiding method according to claim 10, the method further comprising:
highlighting the related RFID regions while displaying the template connection diagram and the additional information, when the RFIDs to be related to the terminal-side RFID region, and the cable-side RFID region in the template connection diagram, are read by the RFID reader.

12. The cabling work aiding method according to claim 10, wherein the information is added by providing an inputting region overlapped on the displayed template connection diagram, so that the inputting region accepts a memo written therein.

13. The cabling work aiding method according to claim 10, wherein the additional information is added by inputting text, item by item, for the respective RFID regions in the template connection diagram.

14. The cabling work aiding method according to claim 10, wherein a shape and a positional coordinate of each RFID region in the template connection diagram are determined in advance, with reference to a reference position in the diagram.

15. The cabling work aiding method according to claim 10, further comprising:
indicating the RFID region related to the RFID read by the RFID reader, when a cable-terminal connection situation is changed, and
reading RFIDs assumed to be originally related to the terminal-side and cable-side RFID regions indicated by the RFID confirmation requesting part, and when the read RFID is not the same as the original RFID, recognizing that the cable-terminal connection situation has changed, and renewing the cable-terminal connection data so that a pair of the RFID at the terminal side and the RFID at the cable side is corrected.

16. The cabling work aiding method according to claim 9, further comprising:
preparing a first drawing containing the RFID regions related to the RFIDs read by the RFID reader, and a second drawing configured to be read by a scanner of revised result, the second drawing having been added on a printed paper of the first drawing,
positioning the RFID regions of the first drawing with those of the second drawing, and extracting a correspondence between these regions, and
highlighting the RFID regions of the second drawing corresponded to those of the first drawing by the positioning step, while displaying the second drawing.

* * * * *